United States Patent [19]

Groh et al.

[11] Patent Number: 4,629,593

[45] Date of Patent: Dec. 16, 1986

[54] PROCESS FOR PRODUCING POLYCRYSTALLINE, TRANSLUCENT SINTERED TUBES

[75] Inventors: Heinrich Groh, Lauf; Reinhold Gradl, Rueckersdorf, both of Fed. Rep. of Germany

[73] Assignee: Hoechst CeramTec Aktiengesellschaft, Selb, Fed. Rep. of Germany

[21] Appl. No.: 643,176

[22] Filed: Aug. 22, 1984

[30] Foreign Application Priority Data

Aug. 26, 1983 [EP] European Pat. Off. ............ 83108397

[51] Int. Cl.[4] .................................................. C04B 35/64
[52] U.S. Cl. ........................................ 264/63; 264/65; 264/66; 264/209.1; 425/376 R; 501/153
[58] Field of Search ........................... 264/63, 209.1

[56] References Cited

U.S. PATENT DOCUMENTS

| | | | |
|---|---|---|---|
| 3,026,210 | 3/1962 | Coble | 264/56 |
| 4,020,134 | 4/1977 | Gordan et al. | 264/63 |
| 4,169,875 | 10/1979 | Laska et al. | 264/63 |
| 4,396,595 | 8/1983 | Heytmeijer et al. | |

FOREIGN PATENT DOCUMENTS

| | | |
|---|---|---|
| 1696440 | 8/1970 | Fed. Rep. of Germany . |
| 3201750 | 9/1982 | Fed. Rep. of Germany . |
| 2022564 | 12/1979 | United Kingdom . |
| 2071073 | 9/1981 | United Kingdom . |

*Primary Examiner*—James Derrington
*Attorney, Agent, or Firm*—Schwartz, Jeffery, Schwaab, Mack, Blumenthal & Evans

[57] ABSTRACT

An improved process for producing polycrystalline, translucent sintered aluminum oxide tubes for use as high pressure gas discharge lamps is provided, in which an aluminum oxide powder mixture is dispersed and foamed prior to plasticizing. Into the dried powder plasticizing components based on PVA or low viscosity, weakly swelling methylcellulose adhesives in the form of a paste are mixed and the powder mixture subsequently cold formed to tubular form by extrusion. The application of these measures results not only in an especially low surface roughness with an average value of 0.2 micron, but also in a mechanical strength of at least 320 N/mm² and an in-line light transmission of more than 64%.

14 Claims, 2 Drawing Figures

PROCESS FOR PRODUCING POLYCRYSTALLINE, TRANSLUCENT SINTERED TUBES

BACKGROUND OF THE INVENTION

The present invention relates to a process for the production of polycrystalline, translucent sintered tubes from more than 99.5% by weight aluminum oxide powder with a grain size less than 1 micron, to which optionally small amounts of magnesium oxide and zirconium oxide may be added. A mixture is made up with binders and lubricants and this initial material extruded into molded bodies and sintered by mild firing between 900° C. and 1200° C. and firing between 1750° C. and 1900° C. in a hydrogen atmosphere or a vacuum. By means of a special extrusion apparatus and a particular process of plasticizing a substantial improvement of the surface properties of the tubes is obtained. This further results in excellent light transmission and a very high mechanical strength.

DE-OS No. 29 18 729 discloses a process for the production of such polycrystalline, translucent aluminum oxides for use in high pressure gas discharge lamps wherein the sintered body has an average grain size of not less than 20 microns. This process is based on an aluminum oxide powder with a grain size of less than 1 micron and a purity of more than 99.5% by weight, to which optionally the additives MgO, $La_2O_3$ and $Y_2O_3$ may be added, whereupon the powder is thoroughly mixed and the initial material pressed into a molded body, followed by firing in two stages, i.e. once at 1300° C. to 1500° C. and sintering between 1650° C. and 1900° C. for up to 15 hours in a hydrogen atmosphere or in a vacuum. The heating rate should be at least 200° C./hour between 1400° and 1700° C. in order to improve the surface roughness of the product, which on the sintered product is between 3 and 7 microns. Two firing stages are obviously highly cost intensive and in view of the long holding times, the process is time consuming. Furthermore, the growth of crystals during firing is difficult to control, so that reproducibility is difficult.

A further possibility to increase in-line light transmission is described in U.S. Pat. No. 3,935,495, wherein the sintered surface of the aluminum oxide is treated chemically with a flux. This simultaneously reduces the roughness of the surface, but this process step is complicated and involves high production costs. In addition, this chemical etching reduces the mechanical strength of the tubes.

Further polycrystalline aluminum oxide materials are known exhibiting improved in-line light transmission as the result of the use of a special selection of additives. In particular, West German Patent No. 31 08 677 should be mentioned wherein by the addition of 0.03 to 0.15% by weight MgO and 0.002 to 0.07% by weight of a total amount of $ZrO_2$ and $HfO_2$ an improvement of the quality of the sintered tubes is obtained.

Altogether, it has been found that MgO is a necessary component in aluminum oxide ceramics, if a high degree of translucence is to be achieved in the sintering process. In particular, MgO controls grain growth during the later sintering stages. The addition of $ZrO_2$ or $HfO_2$ is effected to control the evaporation of magnesium in the sintering phase and to simultaneously prevent the formation of spinel in the final product.

It is further disclosed in DE-OS No. 28 10 128 that a conventional binder and lubricant may be added to the initial mixture in order to make possible the extrusion of a pressed, compact body in the form of a sintered tube. A presintering stage is further necessary to remove the organic components prior to sintering. Accordingly, a mild firing is effected in an oxygen-containing atmosphere at temperatures of approximately 900° to 1200° C.

Another process for the production of translucent sinter oxide bodies is disclosed in DE-OS No. 32 01 750 wherein in particular the extruding tool is being treated. The additives zirconium oxide, hafnium oxide, cerium oxide and/or magnesium oxide are preferably added to the aluminum oxide powder. The powder is mixed in a known manner with plasticizers corresponding to 12% by weight paraffin and 1% by weight stearin. The density of the formed tubes is between 40 and 70% by weight, preferably 60% by weight, of the theoretical density of the corundum. In the extrusion of the tubes special care is taken to ensure that a favorable flow of material occurs in the extrusion tool. The forming process is described in much detail and is effected in two steps, first the preparation of the cylindrical raw blanks by injection molding and then the final shaping by hot extrusion. The individual tubes are then embedded in aluminum oxide powder to subsequently remove organic substances. Prefiring is effected at 1100° C. for one hour; subsequent sintering is then performed in a vacuum furnace at 1800° C. This method has two disadvantages, in that additional expensive $Al_2O_3$ must be used for the embedding and then the adhering powder must be removed in a subsequent work step. Furthermore, contact reactions of the tubes may occur during sintering due to the horizontal position of the tubes. Tubes produced in this manner have a light transmission of 93% and a bending strength of 600 $N/mm^2$, but since the measuring method used to determine the bending strength is not described, these values cannot be compared with others. Density is around 3.98 $g/cm^3$ and the average crystal size is approximately 10 microns, which indicates poor in-line light transmission. This forming process eliminates the isostatic presses generally used, but does not produce a sintered tube with optimum properties in view of light transmission and mechanical strength, which are the principal problems encountered in later use as high pressure gas discharge lamps. Fundamentally it may be stated that the problem is the crystal size of the sintered $Al_2O_3$ body. While with rising crystal sizes light transmission increases, the mechanical strength is reduced. With declining crystal sizes the two parameters are affected inversely. Furthermore, the plasticizer proportion of 13% paraffin and stearin is high, which is the cause of the appreciable shrinkage, invoking the danger of an excessive number of micropores in the sintered tube. In addition, the straightness of the sintered tube may be affected, if larger amounts of the plasticizer are introduced in an inhomogeneous manner into the aluminum powder. It has been found in principle that in addition to the use of a suitable aluminum oxide powder with the appropriate additives, the sintering process also is important but that primarily the forming process has a significant effect on the sintered end product.

SUMMARY OF THE INVENTION

It is therefore an object of the present invention to provide a process and apparatus, which by means of novel plasticizer combinations, will result in improved light transmission mechanical strength and reduced surface roughness of polycrystalline, translucent sintered tubes.

It is another object of the present invention to provide a process for the manufacture of an improved sintered tube as above, wherein this process is less costly and less time consuming than processes disclosed in the prior art.

Yet another object of the present invention is to provide a process which exhibits improved control over crystal growth during the sintering stage, and thus improved reproducibility.

In accomplishing the foregoing objects, there has been provided in accordance with one aspect of the present invention a process for the production of polycrystalline, translucent sintered tubes, comprising the steps of mixing dry aluminum oxide powder having at least 99.5% by weight purity and a grain size of less than about 1 micron, with a water soluble, paste-like plasticizer mixture based on polyvinyl alcohol (PVA) or low viscosity, weakly swelling methylcellulose adhesives, fats and/or oils, glycerol and wetting agents, to form a plasticized extrudable mass; a cold deformation of the mass is effected by extruding it into shaped bodies through a device which comprises another aspect of the present invention, such that the shaped bodies have glossy surfaces, and a density of from about 50 to 70% by weight of the theoretical density of $Al_2O_3$; and the shaped body is sintered by prefiring at temperatures of between about 900° C. and 1200° C., and fired in a vacuum or hydrogen at temperatures of from about 1750° C. to 1900° C.

In accordance with another aspect of the present invention, an apparatus is provided comprising a polished hard carbide extrusion tool which defines a chamber having a surface quality Ra of at least less than 0.15 microns. An extrusion mandrel is coaxially disposed within the extrusion tool, being held in position by two sets of three radially extending spokes each connected to the mandrel and to the inner surface of the chamber wherein one set of spokes is staggered in relation to the other.

The problem in the production of a polycrystalline, translucent sintered tube with a low surface roughness and thus higher light transmission and improved mechanical strength properties consists not only of the defined introduction of additives and a certain conduct of the sintering process, but also of the specific selection of lubricants and binders for the raw state of the mass, in order to obtain the highest homogeneity possible. Further optimization is to be found in the processing method and the configuration and properties of the extrusion tool.

These objects are attained according to the invention by preparing the dried $Al_2O_3$ powder mixture with a water soluble plasticizer mixture in the form of a paste, based on PVA or low viscosity, low swelling methylcellulose adhesives and fats or oils together with glycerol and wetting agents, the plasticized mixture is subsequently deformed cold in a piston press with the use of a special extrusion tool, whereby the molded body is given a density of 50 to 70% by weight of the theoretical density of the aluminum oxide and a glossy surface.

Other details of additional developments of the invention are set forth in the dependent claims.

Further objects, features and advantages of the present invention will become apparent from the detailed description of preferred embodiments which follows, when considered together with the attached figures.

DETAILED DESCRIPTION OF PREFERRED EMBODIMENTS

Figure 1A:
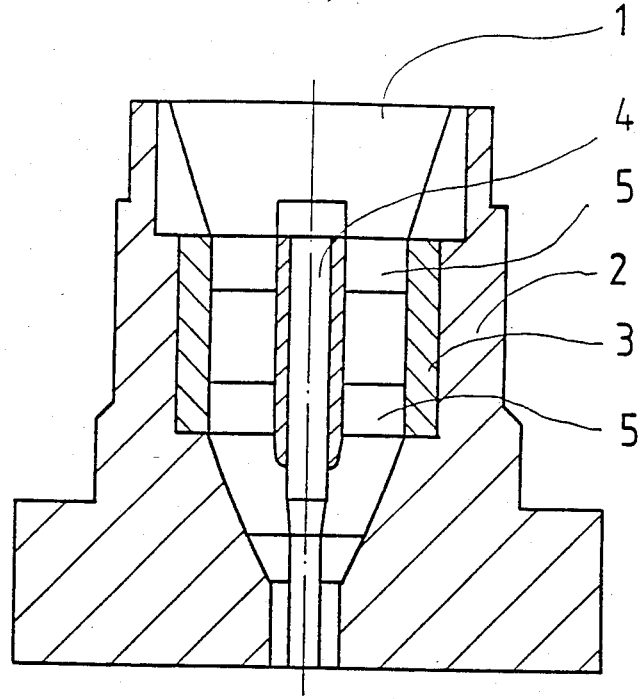
FIG. 1A is a vertical section of an extrusion tool or extrusion die according to the invention.

In the present invention the improved properties of the polycrystalline, translucent sintered tube in particular depend on the use of the binders and lubricants. For optimum results, an aluminum oxide powder with a purity higher than 99.5% by weight and an average grain size of not larger than 1 micron is used, with a specific surface area of approximately 14 $m^2/g$. Dispersion in water is effected with the addition of 0.75 to 2.0% by weight of a fluidizing agent, such as for example ammonia free of sodium, in a disk mill wherein the milling disks consist of a 99.7% aluminum oxide ceramic. In this manner, no impurities are introduced by abrasion, which is possible, for example, in conventional ball mills. The suspension is subsequently screened to remove the agglomerates which later would lead to the so-called "white spots" in the sintered ceramic. It has been found to be especially advantageous to add to the dispersed slurry after screening a mixture of 0.1 to 0.5% by weight glycerol and 0.3 to 2.5% by weight oil in a ratio of 1:3 to 1:5, whereby foaming is obtained. The drying of the slurry is effected at temperatures between 80° and 100° C., whereafter the residual moisture is approximately 3%. Following this procedure, a very soft and loose, unsedimented powder is produced, which is readily distributed during the subsequent mixing. This powder thus already contains certain components of the later, water soluble plasticizing mixture in paste form, whereby an optimum affinity of the powder to the fatty mixture is subsequently obtained, leading to an extremely high homogeneity of the plasticized mass. Special care must be taken to ensure that during drying the temperature does not exceed 100° C., to prevent coking or hardening of the organic components. The division of the agglomerates in the disk mill may be eliminated if a loose aluminum oxide powder with a small size of the agglomerates is present. This process step is followed by plasticizing and the optional introduction of additives.

In principle, the individual plasticizer components are stirred to a paste prior to their addition to the powder mixture.

This paste, which forms from 11.2 to 19.5% by weight of the $Al_2O_3$ powder, consists of a water soluble plasticizer based on 3.0 to 4.5% by weight PVA or low viscosity, low swelling methylcellulose adhesives, which show good wetting and dispersion of the agglomerates. The chemical basis of PVA adhesives consists of polymer hydroxyl compounds, with a viscosity in a 5% solution of 100 cp. The fats, which comprise from 2.0 to 4.0% by weight of the $Al_2O_3$ powder, contain short chain fatty acids. The oil which comprises from 5.5 to 8.5% by weight of the $Al_2O_3$ powder is itself a mixture of naphthenic, paraffinic and aromatic hydrocarbons with natural fatty derivatives and polar additives. As further plasticizing components, 0.5 to 1.5% by weight of wetting agents are added. This paste is readily distributed in the dry aluminum oxide powder.

The premixing of the paste is the basis of the super smooth surface of the sintered tube obtained later. If the premixing is not effected and the binder is added without a preceding reaction with the other components, it is almost impossible to avoid the formation of lumps, as even the most accurately controlled addition of adhesives, together with intensive mixing, does not lead to the surrounding of all of the aluminum oxide particles with an adhesive film. Rather, parts of the powder agglomerate into large lumps. The sequence of the addition of the individual plasticizer agents is also important. If the oil is added first, the $Al_2O_3$ powder with its large specific surface immediately absorbs the oil and there is no adequate wetting of the powder upon the addition of the adhesive.

The addition of magnesium oxide and possibly zirconium oxide is subsequently performed. It has been found particularly appropriate to mix in magnesium oxide in amounts of 0.03 to 0.08% by weight, preferably 0.05% by weight and zirconium oxide in an amount of 0.002 to 0.05% by weight, preferably 0.01% by weight, with these oxides being present in the preliminary stage as chlorides, carbonates and acetates. After mixing, the plastified mass is emptied into the cylinder of a press evacuated and precompressed. Thereafter, the forming process is effected by means of a piston press with a pressing pressure of 200 to 500 $kg/cm^2$ and a special outlet nozzle. The essential requirement for the design of the extrusion tool is to maintain the friction between the mass and the extrusion tool as low as possible. Thus, the selection of the material and the surface properties of the extrusion tool are therefore of decisive importance. Hard carbide materials have the advantage that there is no abrasion upon contact with the abrasive $Al_2O_3$ powder. If abrasion does occur, as with standard steel tools, differential sliding properties are developed on the inner sides of the extrusion tools, leading to a nonuniform densification of the shaped bodies. Furthermore, the shaped bodies have a roughened surface at the abrasion location and optimum surface qualities cannot be obtained on the extruded tube. In a special case the surface roughness Ra of the polished carbide tool is less than about 0.15 micron. This provides an additional smoothing of the surface of the emerging shaped bodies, when the plasticized aluminum oxide powder is sliding along the wall of the drawing tool. Optimum surface gloss is thus obtained.

The design of the extrusion tool is also of decisive importance. Here again the effect of friction must be taken into account. The extrusion tool must have a configuration favorable with respect to flow, i.e. the pressure generated should affect as little of the surface as possible and should be distributed over the extrusion tool tapering in the forward direction. For this reason the conical surfaces are maintained as small as possible, as friction is significantly lower on cylindrical surfaces. In addition, the construction must be symmetrical so that the distribution of pressure on the drawing mass will be uniform. The arms of the three point spider for holding the extrusion core are therefore offset in a manner to form a six point spider. Although the forcibly transported extrusion is again divided, it is fused together in the last part of the extrusion die. The extrusion die also has a long outlet path, whereby possible differences in density are reduced during the exit from the extrusion die. Furthermore, as a result of the good density and sliding properties of the plasticized mass, the platelet shaped structures of the aluminum oxide crystals are uniformly aligned during the extrusion. This result is particularly encouraged by use of extrusion tools of polished carbides and having the aforementioned design.

The tubes are deposited on perforated aluminum sheets to obtain uniform drying. Drying itself is effected in dust free chambers with a slight overpressure and at ambient temperature. Prefiring takes place between 900° and 1200° C. with a holding time of 12 hours in an electric furnace with an oxidizing atmosphere. This measure is appropriate in order to drive all organic components out of the material prior to sintering in vacuum or a moist hydrogen atmosphere. The temperature must not exceed 1250° C. so that no presintering of the material will take place. This indicates that the heating rate plays an important role in the sintering of the molded bodies, as it is possible thereby to control the grain size again. It has been found that a heating rate of at least 800° C./hour, preferably between 800° and 1000° C./hour, will result in an optimum sintered product within a range of 1200° to 1900° C. Sintering in a high vacuum is effected at a temperature of up to 1900° C.

Sintered aluminum oxide tubes have the following properties: in-line light transmission is greater than 64% and total transmission is between 93 and 96%; crystal size is between 20 and 40 microns; sintering density is 3.98/cm$^3$ and surface roughness is between 0.1 to 1 micron, preferably 0.2 micron. Mechanical strength is higher than at least 320 N/mm$^2$. Further advantages of the process according to the invention are to be found in the fact that the tubes need no further processing in the raw state, such as that occurring for example in isostatic pressing by profiling, whereby a significant loss of the mass is incurred. The outstanding properties of the plasticizer paste and the good densification, together with the sliding properties of the mass during extrusion renders a secondary processing of the sintered tubes unnecessary. There is always a risk, for example in flux polishing, that structural damage may occur during extended etching times. Furthermore, with the process according to the invention the expenditure of energy and time is very low during sintering, as the firing cycle amounts only to between 8 and 10 hours. It has been discovered surprisingly that the measures according to the invention have a highly favorable effect on the surface roughness of the sintered $Al_2O_3$ body, on its mechanical strength and on its optical properties. The smaller the average crystal size, the better the mechanical strength values determined, while optical properties are affected inversely.

By means of a configuration extremely favorable for the flow, it is assured additionally that the extremely smooth surface of the mass will not be damaged during the extrusion process. Furthermore, the risk of the tubes emerging in a bent condition from the extrusion tool is very low, as the frictional resistance is kept as low as possible. This again contributes to a very high dimensional accuracy of the sintered product.

Further details of the invention will be explained with reference to an illustrative embodiment. In particular, the extrusion tool is shown in FIGS. 1A and B.

As seen in Table 1, various experiments were performed using the process according to the invention, concerning the effects of dispersion and foaming of the aluminum oxide powder; the pre-reaction of the adhesive with the oil, and the incorporation of additives with regard to surface roughness.

TABLE 1

| Exp. | Sinter condition (temp./°C./h) hold time | Average grain size (microns) | Average roughness (microns) | In-line light transmission (%) | Bending strength (N/mm²) |
|---|---|---|---|---|---|
| V 1 | 1830/2 | 32 | 0.20 | 69 | 380 |
| V 2 | 1830/2 | 37 | 0.50 | 62 | 320 |
| V 3 | 1830/2 | 23 | 0.90 | 51 | 280 |
| V 4 | 1830/2 | 40 | 0.25 | 65 | 265 |
| V 5 | 1850/1 | 26 | 1.9 | 59 | 310 |

Average grain size, average surface roughness, in-line light transmission and the bending strength were measured on sintered tubes of the 70-Watt type, such as those used in high pressure sodium vapor discharge lamps. The average grain size was determined by the examination of the sintered surface with an electron beam microscope. Surface roughness was measured with a Hommel tester, by scanning the tube in the axial direction over a length of 5 mm. To measure the in-line light transmission, a beam of light was directed onto the concave surface with a wave length of 0.94 micron and an angle of incidence of (6°). The intensity of the light was measured by means of a measuring probe at an exit angle of 60°.

The wall thickness of the sintered body was 0.60 mm±0.3. Bending strength was measured by the 3 point method. The support spacing was 40 mm.

EXAMPLE 1

Examples 1 (V1) and 2 (V2) demonstrate the effect of the dispersion and the subsequent foaming of the aluminum oxide powder on the properties of the sintered product.

In Experiment 1 (V1) 4000 g $Al_2O_3$ powder with a purity in excess of 99.5%, a particle size less than 1 micron and a specific surface of approximately 14 m²/g are placed into a disk mill, in which 10 kg distilled water with 1% fluidizing agent, for example ammonia free of sodium, are already present. The suspension is ground for 20 minutes and screened through a synthetic plastic sieve with a mesh width of 10 microns. Subsequently, into the slurry 0.2% by weight glycerol and 0.8% by weight oil are stirred with an agitator, resulting in a slurry with a cream like consistency containing a large number of air bubbles. Drying is effected on metal sheets at 80° C. to a residual moisture content of 3%. The individual plasticizing components are stirred separately into a paste, with the paste itself consisting of 3.75% by weight of a water soluble PVA binder dissolved in a proportion of 1:4 in water, 7% by weight oil and 3% by weight fats, together with 0.3% by weight wetting agents and 1% glycerol, with reference to the weight of the dried $Al_2O_3$ foam. This paste is then added to the dried $Al_2O_3$ foam, while stirring in simultaneously 0.265% by weight magnesium acetate and 0.07% by weight zirconium chloride. The total period of mixing amounts to approximately 1.5 hours, during which distilled water is being added constantly to a total of 7% by weight, in order to obtain a plasticized mass with a dough like consistency. Subsequently, this mass is evacuated and precompressed in a piston press and extruded by means of a multihole die into extrusions with a diameter of 3 mm, which are again evacuated and precompressed in a press cylinder.

Figure 1B:
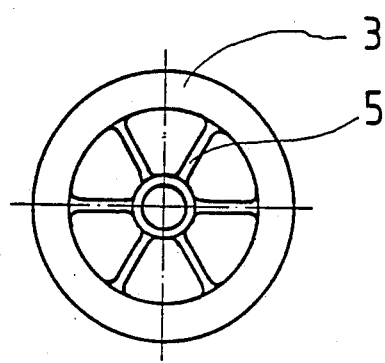
FIG. 1B is a top plan view of the extrusion tool of FIG. 1A.

FIGS. 1A and 1B show the extrusion tool 1 according to the invention. It consists of an outer housing 2, in which a double, three-spoke spider 3 is located staggered as shown in FIG. 1B. The press tool dimensions in this case are determined for nominal dimensions of 0 6.1×4.35 mm. The mandrel 4 is held by the spokes 5.

Compression pressure is higher than 200 kg/cm², with the extruded tubes being cut to lengths of 800 mm and placed onto perforated prism sheets. After drying, these tubes are cut into individual tublets, the cutting dust taken simultaneously away and these raw bodies annealed in stacks in an oxidizing atmosphere at 1100° C. for two hours. During this firing period the magnesium acetate and the zirconium chloride are converted to magnesium oxide and zirconium oxide. Other components which might interfere with optical properties, are driven out. At sintering temperatures of 1830° C., a holding time of 2 hours and a heating rate of 800° C./hour, the raw bodies attain their translucent appearance in sintering in a moist hydrogen atmosphere.

In Experiment 2 (V2) the same initial mixture as in Experiment 1 is used, but the aluminum oxide powder is added without dispersion and foaming into the mixer.

As indicated by the results in Table 1, the dispersion and foaming of the aluminum oxide powder contribute to improvements of surface properties. During dispersion, the agglomerates are divided in the disk mill into individual crystals without impurities and foaming prevents the clumping together of the individual crystals, so that a powder that is readily divided and accessible to the plasticizing components is present. If the dispersion and foaming are omitted, the agglomerates are not divided and surface quality deteriorates because of the differential grain size. Furthermore, irregularities occur in the plasticized mass, which appear as "white spots" in the sintered tube. Such "white spots" lead to a reduction of light transmission and a diminution of mechanical properties.

EXAMPLE 2

By means of Experiment 3 (V3) the prereaction of the adhesive with the oil in connection with surface roughness is more closely investigated. In this experiment 4000 g of the $Al_2O_3$ powder with known properties are again dispersed and dried as in Experiment 1, 0.3% by weight of wetting agents and 3.75% by weight of the PVA binder are added to the mixer and the following components are mixed in individually at 5 minute intervals: 7% by weight oil, 3% by weight fat, 1% by weight glycerol and approximately 7% by weight distilled water. The additives of 0.265% by weight magnesium acetate and 0.07% by weight zirconium chloride are also mixed in. The remaining steps of the process are effected as in Experiment 1.

Table 1 clearly shows a deterioration of surface roughness in Experiment 3 (V3). If the plasticizing components are added in the aforementioned sequence, inhomogeneities occur in the plastic mass, as the binder is not distributed uniformly in the fine $Al_2O_3$ powder. The plasticized mass then can no longer be compressed uniformly so that the extrusion properties are worsened as the result of the differential sliding action. These inhomogeneities then become visible as "white spots" in the sintered tublets.

EXAMPLE 3

In Experiment 4 (V4) the inclusion of additives (doping) is considered in evaluating surface quality, wherein the production of the sintered tube is effected in a manner similar to the process in Experiment 1, with the exception that the included additive consisted only of 0.265% by weight magnesium acetate and sintering was performed in vacuum.

As seen in Table 1, even though no effect on surface roughness may be detected, the crystal structure shows a somewhat nonuniform grain growth, which however, does not affect in-line light transmission. The type of additives included thus does not appear to have an effect on the surface roughness of sintered tubes.

In order to once again demonstrate the advantages of the extrusion process according to the invention compared to conventional isostatic press methods, Experiment 5 (V5) was included in Table 1. In this experiment again 4000 g Al$_2$O$_3$ powder were ground as in Experiment 1 and the slurry spray dried. The spray dried granules were pressed isostatically at a pressure of 1400 bar into a tubular molded body. The tube pressed on a mandrel is rolled on its outermost circumferential surface.

The disadvantages of this process are made apparent by the determination of surface roughness. In spite of careful processing with fine grinding disks, the surface quality is not attained. Tool marks are produced leading to the scattering of light on the surface, whereby light transmission is reduced. Furthermore, under the multi-directional pressure loading in isostatic pressing the lamellar crystals are not aligned parallel to the surface of the tube, so that the surface remains rough.

The foregoing description has been set forth merely to describe illustrative embodiments of the invention and is not intended to be limiting. Since modifications of the described embodiments incorporating the spirit and substance of the invention may occur to persons skilled in the art, the scope of the invention should be limited solely with respect to the appended claims and equivalents.

We claim:

1. A process for producing polycrystalline, translucent sintered tubes, comprising the steps of:
   (a) preparing a water-soluble paste-like plasticizer mixture comprising:
      (1) an adhesive selected from the group consisting of polyvinyl alcohol adhesives, low-viscosity, weakly-swelling methylcellulose adhesives, and mixtures thereof,
      (2) at least one lubricant selected from the group consisting of fats and oils,
      (3) glycerol, and
      (4) a wetting agent;
   (b) mixing the plasticizer mixture from step (a) with aluminum oxide powder and water to form a homogeneous plasticizer mass;
   (c) cold forming the plasticized mass in an extrusion press to produce an unfired tubular body having a glossy surface and a density from about 50 to about 70% of the theoretical density of aluminum oxide; and
   (d) firing the extruded tubular body to a polycrystalline, translucent sintered tube.

2. A process according to claim 1, wherein said firing step comprises the steps of:
   (ci) prefiring the extruded tubular body at temperatures from about 900° C. to about 1200° C.; and
   (cii) thereafter sintering the prefired body at temperatures from about 1750° C. to about 1900° C.

3. A process according to claim 1, wherein said aluminum oxide powder has a purity of at least about 99.5 percent and a grain size of less than about 1 micron.

4. A process according to claim 1, further comprising the steps of grinding the aluminum oxide powder in the presence of water and a fluidizing agent to produce an aqueous slurry of aluminum oxide, screening said slurry to remove coarse particles therefrom, adding glycerol and oil to said slurry, agitating the glycerol and oil containing slurry to incorporate air therein and produce a foamed mass, and drying said foamed mass at a temperature not exceeding 100° C.

5. A process according to claim 4, wherein a mixture of from about 0.1 to 0.5% by weight glycerol and from about 0.3 to 2.5% by weight oil in a proportion of from about 1:3 to 1:5 is added to said slurry.

6. A process according to claim 1, wherein said plasticized mass includes from about 11.2 to 19.5% by weight of said water-soluble, paste-like plasticizer mixture comprising from about 3 to 4.5% by weight PVA or low viscosity, weakly swelling methylcellulose adhesives, from about 5.5 to 8.5% by weight oils, from about 2 to 4.5% by weight fats, from about 0.5 to 1.5% by weight glycerol and from about 0.2 to 1% by weight of a wetting agent.

7. A process according to claim 6, wherein the chemical foundation of the polyvinyl alcohol adhesive consists of polymer hydroxyl compounds, that the fats are highly saturated, short chain fatty acids and that the oils consist of a mixture of naphthenic, paraffinic and aromatic hydrocarbons with natural fat derivatives and polar additives.

8. A process according to claim 2, wherein a constant sintering temperature is maintained for about two to five hours and the heating rate between 1200° and 1900° C. amounts to at least 800° C./hour.

9. A process according to claim 1, further comprising the addition to the aluminum oxide powder of magnesium oxide in an amount within a range of from about 0.03 to 0.08% by weight, and zirconium oxide within a range of from about 0.002 to 0.05% by weight, with said oxides being present in the preliminary step as chlorides, carbonates or acetates.

10. A process according to claim 7, wherein the magnesium oxide is added in an amount of about 0.05% by weight, and the zirconium oxide is added in an amount of about 0.01% by weight.

11. A process according to claim 4, wherein said fluidizing agent comprises sodium-free ammonia, and the grinding occurs in a disk mill wherein the milling disks consist of approximately 99.7% aluminum oxide ceramic.

12. A process according to claim 1, wherein the cold forming is effected by means of a piston press equipped with a low friction extrusion die and wherein the press is operated with a pressing pressure of from about 200 to 500 kg/cm$^2$.

13. A process according to claim 2, wherein said prefiring takes place in an electric furnace with an oxidizing atmosphere for a period of 12 hours.

14. A process according to claim 1, wherein the firing takes place under vacuum or in a moist hydrogen atmosphere.

* * * * *